(12) United States Patent
Shamir

(10) Patent No.: US 10,921,229 B2
(45) Date of Patent: *Feb. 16, 2021

(54) DETECTION SCHEME FOR PARTICLE SIZE AND CONCENTRATION MEASUREMENT

(71) Applicant: Particle Measuring Systems, Inc., Boulder, CO (US)

(72) Inventor: Joseph Shamir, Haifa (IL)

(73) Assignee: PARTICLE MEASURING SYSTEMS, INC., Boulder, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/440,287

(22) Filed: Feb. 23, 2017

(65) Prior Publication Data

US 2017/0176312 A1  Jun. 22, 2017

Related U.S. Application Data

(63) Continuation of application No. 14/359,233, filed as application No. PCT/IL2012/050488 on Nov. 29, 2012, now abandoned.

(Continued)

(51) Int. Cl.
*G01N 15/02* (2006.01)
*G01N 15/14* (2006.01)
*G01N 15/06* (2006.01)

(52) U.S. Cl.
CPC ......... *G01N 15/0205* (2013.01); *G01N 15/06* (2013.01); *G01N 15/1434* (2013.01);

(Continued)

(58) Field of Classification Search
None
See application file for complete search history.

(56) References Cited

U.S. PATENT DOCUMENTS

| 4,806,774 A | 2/1989 | Lin et al. |
| 4,854,705 A | 8/1989 | Bachalo |

(Continued)

FOREIGN PATENT DOCUMENTS

| AU | 2004256318 | 7/2004 |
| CN | 1587984 | 3/2005 |

(Continued)

OTHER PUBLICATIONS

Hemo, E. et al., "Scattering of singular beams by subwavelength objects," Applied Optics, vol. 50, No. 1, Jan. 1, 2011, pp. 33-42.

(Continued)

*Primary Examiner* — Kara E. Geisel
*Assistant Examiner* — Rufus L Phillips
(74) *Attorney, Agent, or Firm* — Leydig, Voit & Mayer, Ltd.

(57) ABSTRACT

The present invention provides a system and method of particle size and concentration measurement that comprises the steps of: providing a focused, synthesized, structured laser beam, causing the beam to interact with the particles, measuring the interaction signal and the number of interactions per unit time of the beam with the particles, and using algorithms to map the interaction signals to the particle size and the number of interactions per unit time to the concentration.

8 Claims, 6 Drawing Sheets

Related U.S. Application Data

(60) Provisional application No. 61/565,529, filed on Dec. 1, 2011.

(52) U.S. Cl.
CPC ..... *G01N 15/1436* (2013.01); *G01N 15/1456* (2013.01); *G01N 15/1459* (2013.01); *G01N 2015/0693* (2013.01); *G01N 2015/145* (2013.01); *G01N 2015/1454* (2013.01)

(56) References Cited

U.S. PATENT DOCUMENTS

| | | | |
|---|---|---|---|
| 4,906,094 A | 3/1990 | Ashida | |
| 4,917,494 A | 4/1990 | Poole et al. | |
| 4,963,003 A | 10/1990 | Hiiro | |
| 5,063,301 A | 11/1991 | Turkevich et al. | |
| 5,471,298 A | 11/1995 | Moriya | |
| 5,719,667 A * | 2/1998 | Miers | G01N 15/1436 356/338 |
| 5,739,527 A | 4/1998 | Hecht et al. | |
| 5,999,256 A | 12/1999 | Jones et al. | |
| 6,084,671 A | 7/2000 | Holcomb | |
| 6,137,572 A | 10/2000 | DeFreez et al. | |
| 7,092,078 B2 * | 8/2006 | Nagai | G01N 15/1459 356/39 |
| 7,526,158 B2 | 4/2009 | Novotny et al. | |
| 7,528,959 B2 | 5/2009 | Novotny et al. | |
| 7,561,267 B2 | 7/2009 | Luo et al. | |
| 7,630,147 B1 | 12/2009 | Kar et al. | |
| 7,746,469 B2 * | 6/2010 | Shamir | G01N 15/1459 356/335 |
| 7,876,450 B2 | 1/2011 | Novotny et al. | |
| 9,857,284 B1 | 1/2018 | Javadi et al. | |
| 9,952,136 B2 | 4/2018 | Javadi et al. | |
| 2007/0030492 A1 | 2/2007 | Novotny et al. | |
| 2008/0079929 A1 | 4/2008 | Luo et al. | |
| 2009/0323061 A1 | 12/2009 | Novotny et al. | |
| 2010/0328657 A1 | 12/2010 | Dholakia et al. | |
| 2015/0260628 A1 | 9/2015 | Shamir | |
| 2017/0191924 A1 | 7/2017 | Pristinski | |
| 2018/0266938 A1 | 9/2018 | Chow | |
| 2018/0269250 A1 | 9/2018 | Chow | |
| 2018/0270434 A1 | 9/2018 | Chow | |
| 2018/0270435 A1 | 9/2018 | Chow | |

FOREIGN PATENT DOCUMENTS

| | | |
|---|---|---|
| EP | 1083424 | 3/2001 |
| EP | 1642113 | 4/2014 |
| JP | S57-037251 | 3/1982 |
| JP | H04188041 | 7/1992 |
| JP | H08-054388 | 2/1996 |
| JP | 2005536740 | 12/2005 |
| JP | 2011133460 | 7/2011 |
| JP | 6309896 | 4/2018 |
| WO | WO 98/50779 | 11/1998 |
| WO | WO 99/06823 | 2/1999 |
| WO | WO 2013/181453 | 5/2013 |
| WO | WO 2013/080209 | 6/2013 |
| WO | WO 2018/170232 | 9/2018 |
| WO | WO 2018/170257 | 9/2018 |
| WO | WO 2019/082186 | 5/2019 |

OTHER PUBLICATIONS

International Search Report and Written Opinion corresponding to PCT/IL2018/051141, dated Feb. 21, 2019.
International Search Report and Written Opinion corresponding to PCT/IL2012/050488, dated Mar. 21, 2013.
International Preliminary Report on Patentability corresponding to PCT/IL2012/050488, dated Jun. 3, 2014.
International Search Report and Written Opinion corresponding to PCT/IL2004/000616, dated Nov. 12, 2004.
International Preliminary Report on Patentability corresponding to PCT/IL2004/000616, dated Oct. 24, 2005.
Japanese Search Report corresponding to Application No. 2014-544046, dated Jul. 28, 2016.
Notification of Reasons for Refusal corresponding to Japanese Patent Application No. 2014-544046, dated Sep. 26, 2016.
Notification of Reasons for Refusal corresponding to Japanese Patent Application No. 2014-544046, dated Aug. 28, 2017.
Office Action (First) corresponding to Chinese Patent Application No. 201280059154.7, dated Jun. 17, 2015.
Office Action (Second) corresponding to Chinese Patent Application No. 201280059154.7, dated May 9, 2016.
Search Opinion corresponding to European Patent Application No. 12854152.1, completed Jun. 2, 2015.
Supplementary Search corresponding to Chinese Patent Application No. 2012800591547, dated Apr. 28, 2016.
Friedmann et al. (1996) "Surface Analysis Using Multiple Coherent Beams," Electrical and Electronics Engineers in Israel, 537-540.
Friedmann et al. (1997) "Resolution enhancement by extrapolation of the optically measured spectrum of surface profiles," Appl. Opt. 36(8): 1747-1751.
Jones (1999) "Light scattering for particle characterization," Progress in Energy and Combustion Science 25(1): 1-53.
Matizen et al. (1987) "Formation of non-gaussian light beams with the aid of a spatially inhomogeneous amplitude filter," Soviet Journal of Quantum Electronics 17(7): 886-887.
Piestun et al. (1994) "Control of wave-front propagation with diffractive elements," Opt. Lett. 19(11):771-773.
Piestun et al. (1996) "Unconventional Light Distributions in three-dimensional domains," J. Mod. Opt. 43(7): 1495-1507.
Piestun et al. (1996) "Wave fields in three dimensions: Analysis and synthesis," J. Opt. Soc. Am. A 13(9): 1837-1848.
Piestun et al. (1998) "Pattern generation with extended focal depth," Appl. Opt. 37(23): 5394-5398.
Piestun (2001) "Multidimensional Synthesis of Light Fields," Optics and Photonics News 12(11): 28-32.
Piestun et al. (2002) "Synthesis of three-dimensional light-fields and applications," Proc. IEEE 90(2):222-244.
Spektor et al. (1996) "Dark beams with a constant notch," Opt. Lett. 21(7):456-458.
Weiner et al. (1998) "Improvements in Accuracy and Speed Using the Time-of-Transition Method and Dynamic Image Analysis for Particle Sizing," American Chemical Society, Chapter 8: 88-102.
European Office Action, dated Jan. 22, 2009, corresponding to European Patent Application No. 04744956.6, 2 pp.
European Office Action, dated Feb. 16, 2012, corresponding to European Patent Application No. 04744956.6, 5 pp.
European Office Action, dated Sep. 24, 2013, corresponding to European Patent Application No. 04744956.6, 7 pp.
European Office Action, dated Oct. 8, 2020, corresponding to European Patent Application No. 12854152.1, 8 pp.
Shamir et al. (2011) "Singular beams in metrology and nanotechnology," Tribute to Joseph W. Goodman, SPIE 8122(1): 1-8.
Bouhelier et al. (2003) "Near-field scattering of longitudinal fields," Applied Physics Letters 82(25): 4596-4598.
Bouhelier et al. (2003) "Near-Field Second-Harmonic Generation Induced by Local Field Enhancement," Physical Review Letters 90(1): 013903-1-013903-4.
Bouhelier et al. (2003) "Plasmon-coupled tip-enhanced near-field optical microscopy," J. of Microscopy 210: 220-224.
Goldberg et al. (2002) "Immersion Lens Microscopy of Photonic Nanostructures and Quantum Dots," IEEE Journal of Selected Topics in Quantum Electronics 8(5): 1051-1059.
Ignatovich et al. (2006) "Real-Time and Background-Free Detection of Nanoscale Particles," Physical Review Letters 96(1): 013901-1-013901-4.
Notification of Reason for Refusal corresponding to Korean Patent Application No. 10-2014-7017139, dated Nov. 22, 2018, 9 pp.
Notice of Allowance corresponding to Korean Patent Application No. 10-2014-7017139, dated Feb. 18, 2020, 3 pp.

(56) References Cited

OTHER PUBLICATIONS

Shamir (Jul. 2012) "Singular beams in metrology and nanotechnology," Optical Engineering 51(7): 073605-1-073605-8.
U.S. Appl. No. 14/359,233, filed May 19, 2014.
U.S. Appl. No. 10/563,662, filed Jul. 8, 2004.
U.S. Appl. No. 16/680,125, filed Nov. 11, 2019.

* cited by examiner

Fig. 3A    Fig. 3B
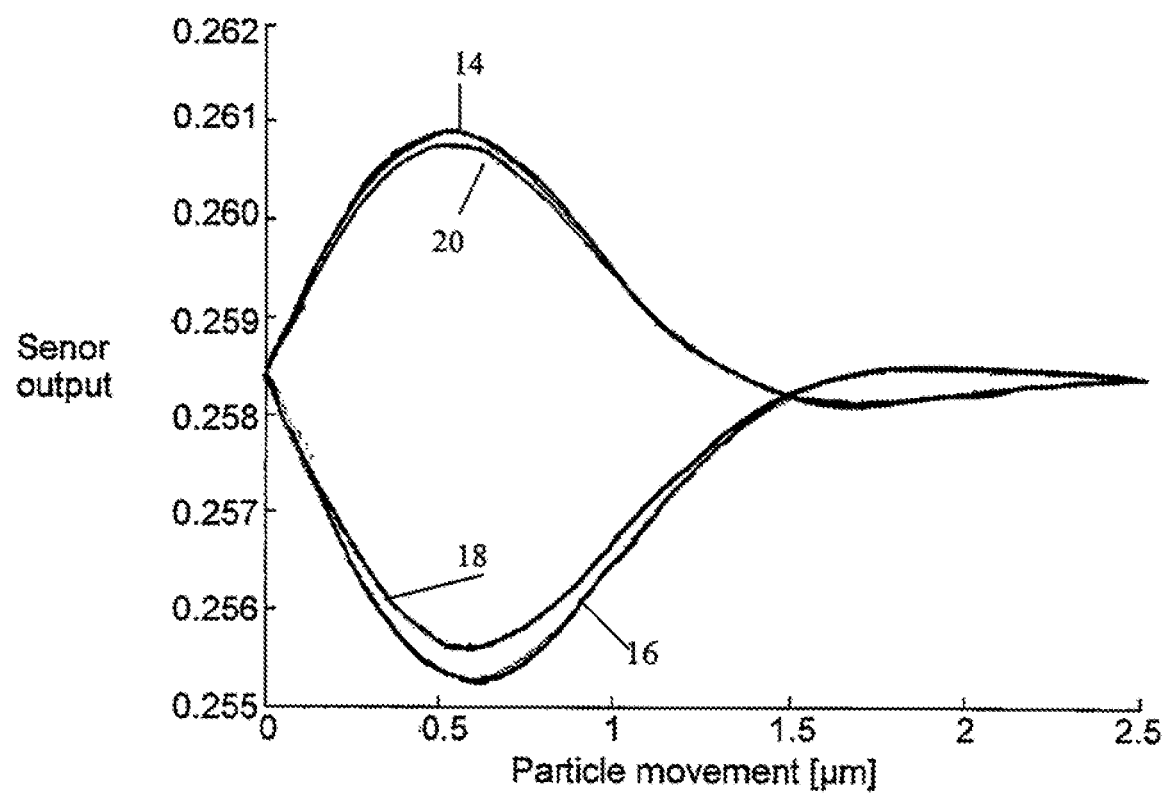
Fig. 4

DETECTION SCHEME FOR PARTICLE SIZE AND CONCENTRATION MEASUREMENT

CROSS REFERENCE TO RELATED APPLICATIONS

This patent application is a Continuation of U.S. patent application Ser. No. 14/359,233, filed on May 19, 2014; which was a National Phase of PCT international application number PCT/IL2012/050488, having an international filing date of Nov. 29, 2012, published as International Publication number WO 2013/080209; which claimed priority and benefit from U.S. provisional patent application No. 61/565,529, filed on Dec. 1, 2011; all of which are hereby incorporated by reference in their entirety.

FIELD OF THE INVENTION

The present invention is related to the field of measuring particle size and concentration. More specifically it relates to the use of optical methods for measuring particle size and concentration.

BACKGROUND OF THE INVENTION

Many techniques exist for particle size and concentration analysis (PSA), they can be reviewed for reference in the book by Terry Alan "Introduction to Particle Size Analysis" T. Allen, Particle size analysis John Wiley & Sons; ISBN: 0471262218; June, 1983. The most commonly used techniques are optical, based on the interaction of the measured particles with laser radiation. Especially when approaching the particle size range around 1 micron and below, most of these techniques suffer from inaccuracies due to the effect of the real and imaginary part of the particle's refractive index. It is known, for example, that in some techniques, such as techniques based on Fraunhoffer diffraction analysis, light absorbing particles would be over sized due to energy loss resulting from the absorption, while in high concentration, particles would be under sized due to secondary scattering etc.

An optical technique that is less sensitive to these problems is known as Time of Transition or TOT. In this technique the interaction of a scanning, focused laser beam and the particles is analyzed in the time domain rather than in the amplitude domain, resulting in lower sensitivity to variation in the refractive index. A detailed description of the technique appears in a paper "Improvements in Accuracy and Speed Using the Time-of-Transition Method and Dynamic Image Analysis For Particle Sizing by Bruce Weiner, Walter Tscharnuter, and Nir Karasikov", [Particle Size Distribution III; Assessment and Characterization; Editor(s): Theodore Provder1; Volume 693, Publication Date (Print): Jun. 10, 1998; Copyright© 1998 American Chemical Society]. To a great extent, in this technique a de-convolution algorithm of the known laser beam profile from the interaction signal derives the size. The concentration is derived from the number of interactions per unit time within the known volume of the focused laser beam.

The interaction of the particles in the TOT technique is with a focused scanning laser beam. In order to measure smaller particles, a smaller focused spot should be used. However according to diffraction laws for a Gaussian laser beam, if the beam's waist is D, the divergence of the beam is proportional to $\lambda/D$ where $\lambda$ is the laser's wavelength. The trade-off between the ability to resolve small particles, to the focus volume and the accuracy in measuring concentration is obvious. Thus if the TOT technique is targeted to resolve and measure particles in the micron and sub-micron range it would be limited in its ability to measure low concentrations as the instantaneous focus volume is small and the interaction rate of particles is low. On the other hand, taking a larger spot will improve the concentration measurement rate but will degrade the quality and resolution of the size analysis.

An improvement could be achieved by using a shorter wavelength. This could have a limited effect of as high as a factor of 2 only since going to too short a wavelength will result in absorption of the laser light by the optics and, in the case of particles in liquid, also absorption by the liquid.

A previous invention by the inventors (U.S. Pat. No. 7,746,469) introduced a new technique and means to decouple between the two contradicting requirements: the ability to resolve small particles and the ability to measure low concentration using measurements based on single particle interactions using a structured laser beam.

It is therefore a purpose of the present invention to provide new detection schemes offering higher sensitivity due to lower particle diameter dependency of the interaction signal.

It is another purpose of the present invention to provide new detection schemes offering the ability to measure higher particle concentration due to inherent optical noise filtration.

It is another purpose of the present invention to provide new detection schemes offering the ability to characterize particles by their interaction signal both in forward and in back scatter.

Further purposes and advantages of this invention will appear as the description proceeds.

SUMMARY OF THE INVENTION

The present invention provides a system and method of particle size and concentration measurement that comprises the steps of: providing a focused, synthesized, structured laser beam, causing the beam to interact with the particles, measuring the interaction signal and the number of interactions per unit time of the beam with the particles, and using algorithms to map the interaction signals to the particle size and the number of interactions per unit time to the concentration.

The particles can be fluid borne, airborne, or on a surface and have a size ranging from sub-micron to thousands of microns. In a preferred embodiment of the invention, the focused, synthesized, structured laser beam is a dark beam.

The structured beam can be generated by employing a mask over a Gaussian laser beam, by directly modifying the laser cavity, by combining the beams from several lasers, or by other manipulations of the laser beam such as in an interferometric or polarization modification scheme. The measurements can be made using the duration of interaction with a scanning beam, including dark field. The invention further provides a system for particle size and concentration measurement.

An alternative approach, which has the advantage of not using any moving parts to scan the beam, is to cause the particles to cross focal region of a focused laser beam.

Other aspects of the invention relate to an improved detection scheme capable of better particle characterization according to the forward and back scatter, detect particle fluorescence and measure the particle velocity.

The present invention introduces new detection schemes offering: higher sensitivity due to lower particle diameter dependency of the interaction signal (much lower than $r^4$ to $r^6$ as with conventional scattering of sub wavelength particles); the ability to measure higher particle concentration due to inherent optical noise filtration; the ability to characterize particles by their interaction signal in forward and back scatter, for example to discriminate between bubbles and particles flowing in a liquid; the ability to measure fluorescence from particles; and the ability to measure the particle's velocity. The latter enables a scanner free system where the flow of particles is either at a known velocity or the velocity of each particle is intrinsically measured.

The invention is a particle monitoring system comprising a laser that generates a Gaussian beam; means for converting the Gaussian laser beam into a structured dark beam; a focusing lens that focuses the dark beam onto particles moving through the illuminating dark beam; and two detectors. One of the two detectors is positioned over each intensity lobe of the dark beam.

The present invention provides a system and method of particle size and concentration measurement that comprises the steps of: providing a focused, synthesized, non-Gaussian laser beam, causing the beam to interact with the particles, measuring the interaction signal and the number of interactions per unit time of the beam with the particles, and using algorithms to map the interaction signals to the particle size and the number of interactions per unit time to the concentration.

In a preferred embodiment of the invention, the focused, synthesized, non-Gaussian laser beam is a dark beam.

The non-Gaussian beam can be generated by employing a mask over a Gaussian laser beam, by directly modifying the laser cavity, by combining the beams from several lasers, or by other manipulation of the laser beam such as in an interferometric or polarization modification scheme.

The invention is a particle monitoring system comprising a laser that generates a Gaussian beam; means for converting the Gaussian laser beam into a non-Gaussian dark beam; a focusing lens that focuses the dark beam onto particles moving through the illuminating dark beam; and two detectors. One of the two detections is positioned over each intensity of the dark beam.

The particle monitoring system of the invention is arranged such that the particles move through the illuminating dark beam in a direction at an angle of 90 degrees relative to the direction of the dark beam.

The signals from the two detectors are recorded in at least one of the following ways:

a) as separate signals;

b) as a differential signal of the two detector signals; and c) as the sum of the two detector signals.

Embodiments of the particle monitoring system of the invention comprise a beam splitter and a second set of detectors oriented in a perpendicular direction to the dark line of the dark beam.

Embodiments of the particle monitoring system of the invention comprise a beam splitter and a third detector arranged to allow simultaneous measurement of back scattered radiation from the particles.

All the above and other characteristics and advantages of the invention will be further understood through the following illustrative and non-limitative description of embodiments thereof, with reference to the appended drawings. In the drawings the same numerals are sometimes used to indicate the same elements in different drawings.

BRIEF DESCRIPTION OF THE DRAWINGS

FIG. 3(a) and FIG. 3(b) show typical signals measured by the two detectors in the system of FIG. 1;

FIG. 4 is a scattering simulation showing half of the signals detected by the two detectors of the system of FIG. 1 for air bubbles and latex particles in water;

DETAILED DESCRIPTION OF EMBODIMENTS OF THE INVENTION

Figure 1:
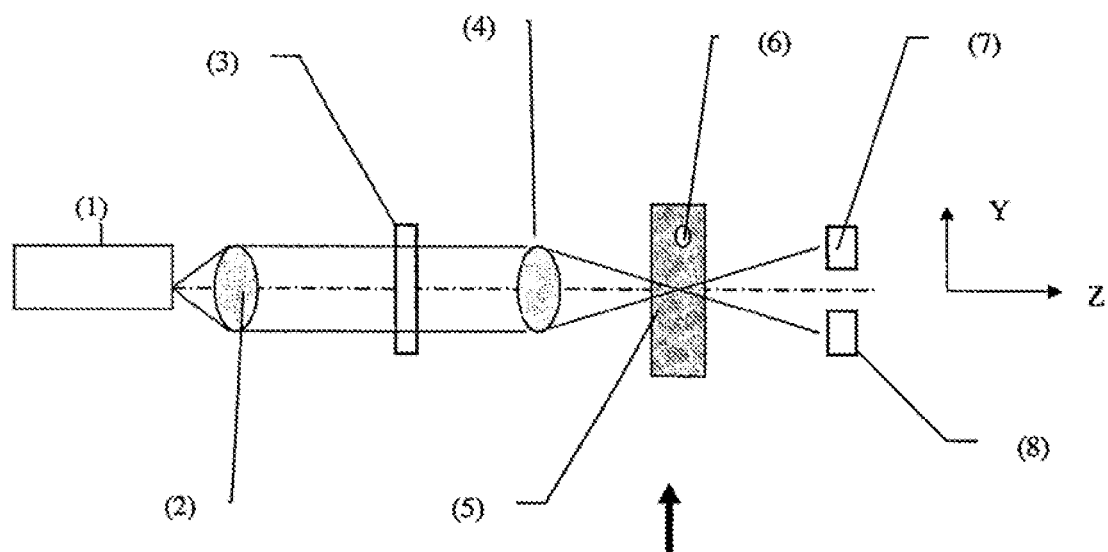
FIG. 1 schematically shows an embodiment of a particle monitoring system.

FIG. 1 schematically shows an embodiment of a particle monitoring system. The system shown in FIG. 1 comprises a laser (1), which generates a Gaussian beam: collimating lens (2); phase mask (3), which converts the Gaussian laser beam into a structured and/or non-Gaussian dark beam; a focusing lens (4), which focuses the dark beam inside a. cuvette (5) through which water containing particles (6) flows in the direction of the arrow; and two detectors (7) and (8).

Figure 2:
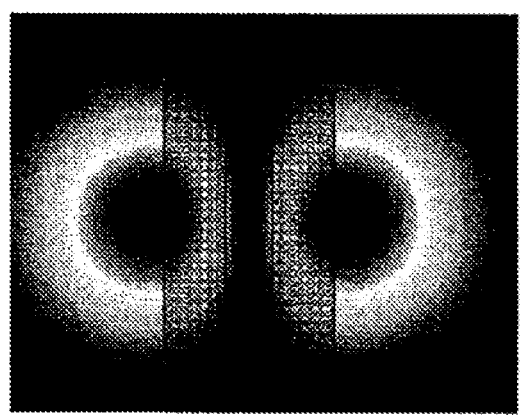
FIG. 2 shows the positioning of the detectors of the system of FIG. 1 with respect to the illuminating dark beam pattern.

It is noted that in the case of airborne particles, the air stream bearing the particles need not be confined within a cuvette. The positioning of the detectors with respect to the illuminating dark beam pattern is shown in FIG. 2. In this embodiment one detector is positioned over each intensity lobe of the original dark beam. As particles cross the beam the output intensity pattern is modified and the detectors sense the change. The detector spacing can be optimized for sensitivity by aligning it to the maximum intensity gradient of the dark beam. For various analytic purposes the detector signals can be recorded either as:

a) separate signals;

b) as a differential signal of the two detector signals; and c) as the sum of the two detector signals.

In another embodiment, a second set of two forward detectors is used via a beam splitter in a perpendicular direction to the dark line of the dark beam.

Figure 12:
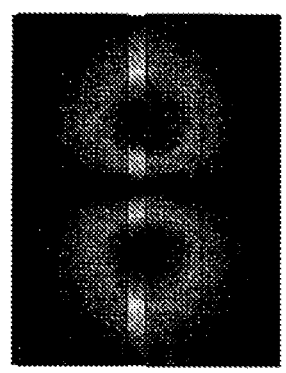
FIG. 12 shows the positioning of the detectors with respect to the illuminating dark beam pattern in an embodiment of the system of the invention that comprises a second set of two forward detectors and a beam splitter oriented in a perpendicular direction to the dark line of the dark beam.

These two detectors are large relative to the beam size and integrate the total beam intensity. FIG. 12 shows the positioning of the second set of detectors with respect to the illuminating dark beam pattern in this embodiment, By checking the symmetry of the signals from these two detectors, one can derive if a particle has crossed the focal zone along its diameter (signals are equal), or along a chord (signals are different) as well as important information on the particle size like the width of the interaction or the depth of modulation in the signal. The timing of these two signals provides information also on the alignment of the particle flow direction and to what extent it is laminar and perpendicular to the optical axis.

Typical signals measured by the two detectors in the system of FIG. 1 are shown in FIG. 3(*a*) and FIG. 3(*b*). In these figures the signals measured by detector 1 (7) are identified by numeral (10) and those by detector 2 (8) are identified by numeral (12). For proper signal interpretation it is necessary to confirm that the particle crossed the beam along the focal plane. According to the present invention the signals of the two detectors appear simultaneously when the particle crosses the beam at focus, as shown in FIG. 3*a*. If the particle does not cross along the focal plane one detector signal is delayed with respect to the other one as is shown in FIG. 3*b*. The shift direction determines also whether the particle crosses the beam before or after the focus. It should be noted that the shape of the signal represents intrinsic particle characteristics.

Since the detector signals qualitatively represent interferometric response they react to the phase modulation by the moving particles. Thus, a particle with refractive index larger than the surrounding medium, e.g. latex in water, will induce, as an example, first a negative signal in detector 1 and a positive signal in detector 2 while a particle with refractive index smaller than the medium (bubble in water) will generate the opposite signal. It should be noted that the main feature is the opposing signals. By changing the detectors order positive/negative could be reversed. FIG. 4 shows half of the simulated signals in the forms of graphs showing detector output vs. the distance moved by the particles for air bubbles and latex particles in water. As a consequence, it is possible to distinguish bubbles from particles. In the figure, curve (14) shows the signal from sensor 1 for air in water; curve (16) shows the signal from sensor 2 for air in water; curve (18) shows the signal from sensor 1 for latex in water; and curve (20) shows the signal from sensor 2 for latex in water.

Figure 5:
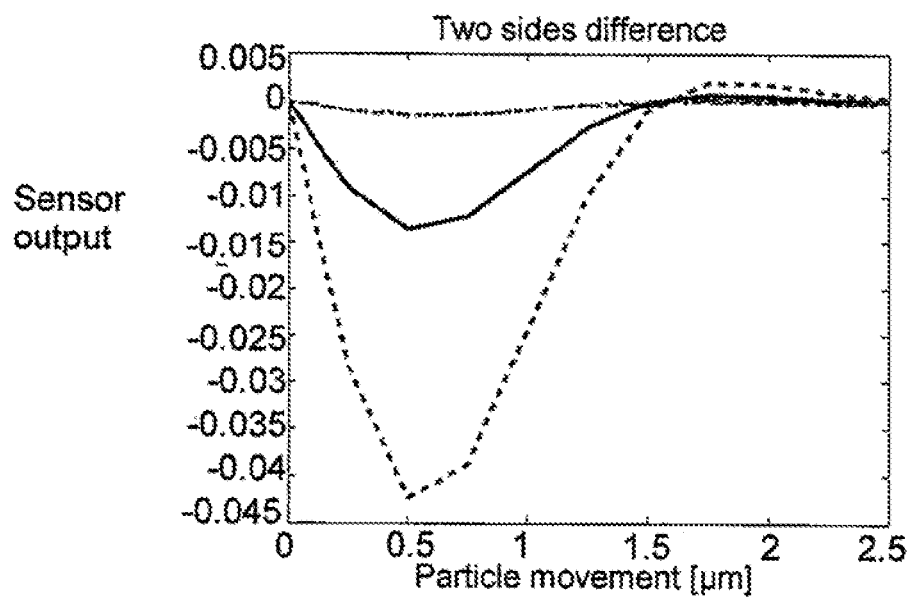
FIG. 5 shows simulated signals for the difference between the signals from the two detectors of FIG. 1 as particles of various size move from the center outward.

Another important aspect of the present invention is a detection scheme with a lower signal intensity dependence on the particle radius r. According to the classical scattering theory, the energy scattered behaves according to $r^4$ or even $r^6$ while in the present invention the signal is a result of a phase shift and the r dependence is between $r^2$ to $r^3$. FIG. 5 is an example of a simulation showing the dependence of the difference signal, i.e. the difference between the signals of the two detectors for three particles of different size (r=50 nm—dotted line; r=100 nm—solid line; r=200 nm—dashed line) moving out from the center of the dark beam pattern shown in FIG. 2. The advantage over the prior art provided by the invention is of a lower required detector dynamic range and a simpler detection scheme. The challenge of having a detector with a dynamic range of 1:10,000 to 1:1,000,000, as needed according to Rayleigh to detect particles in the range 0.1 to 1 micron, is clear to anyone familiar with the art.

For particles typically larger than the spot size, the intensity on the two detectors will reach a plateau and the measuring parameter will be the detectors summation width, which is proportional to the particle size.

Figure 6:
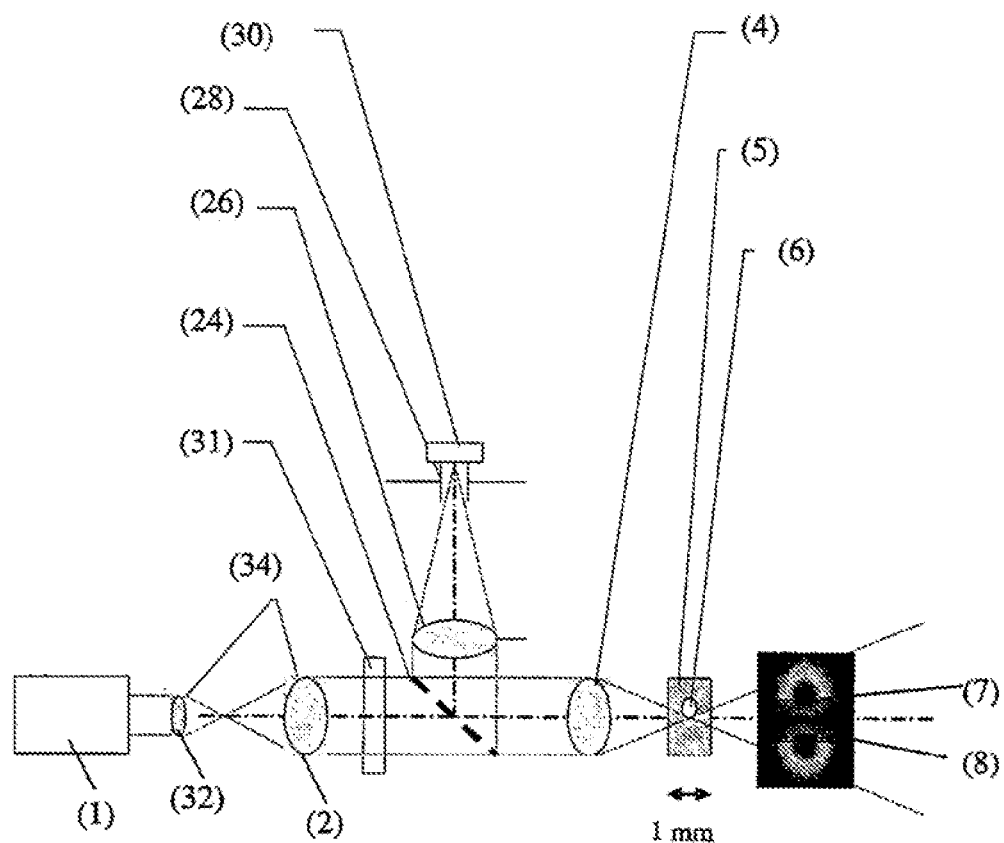
FIG. 6 schematically shows an embodiment of the detector system of FIG. 1 that has been modified to allow also the measurement of backscattering of radiation from the particles.

FIG. 6 schematically shows an embodiment of the detector system of FIG. 1 that has been modified to allow measurement of backscattering of radiation from the particles. The setup is as explained herein above for FIG. 1 with the addition of a beam splitter (24), collecting lens (26), pinhole (28), and the back scatter detector (30). The back scatter radiation from a particle (6) in the focus of the focusing lens (4) is collected by the focusing lens (4), collimated, reflected by beam splitter (24), and directed via the collecting lens (26), which focuses the radiation through pinhole (28) onto the back scatter detector (30). In addition another lens (32) has been added, as may be needed by the type of laser output, between the laser (1) and collimating lens (2) such that lens (32) and (2) act together as a beam expander (34).

In the present invention the back scatter detector has four roles:

- The obvious use of back scatter detector (30) is in a confocal detection scheme to verify that the interaction with the particle was indeed in focus.
- To provide additional size information, where, for particles smaller than the dark spot, the dark beam modulation is inversely proportional to the particle size. On the other hand, for particles larger than the dark spot and moving with constant velocity, the interaction duration is proportional to the particle size.
- The back scattering interaction adds another dimension for differentiation among particle groups based on the fine details of the interaction fingerprint, which could include reflection properties.
- The back scatter detector can detect fluorescence generated by the illuminating beam. In this application the beam splitter (24) is replaced by a dichroic mirror that would reflect the fluorescent light to the BS detector. The ability to measure the fluorescent light in parallel to the detection with the forward detectors, adds a powerful classification tool in cases in which the particle population was stained with a fluorescent stain. This is extremely applicable to Algae to help characterize the algae type or to the detection of pathogenic organisms.

A combination of a beam splitter and a dichroic mirror would allow to detect by two back scatter detectors the back scattered light and the fluorescent light.

The two forward signals and the optional back scatter signals (with and without Fluorescence) are single particle interactions with a high resolution laser focused beam. These interactions function as a high resolution one dimensional scanning laser microscope and provide a lot of information on the particle infrastructure. This information could be used to characterize specific particles. Particles of the same size but different internal structure will have the same interaction width but the internal interaction pulse behavior will differ and be like a "fingerprint" of the particle. An example of how the invention can be used for classification by clustering is shown in FIG. 7 for algae.

Figure 7:
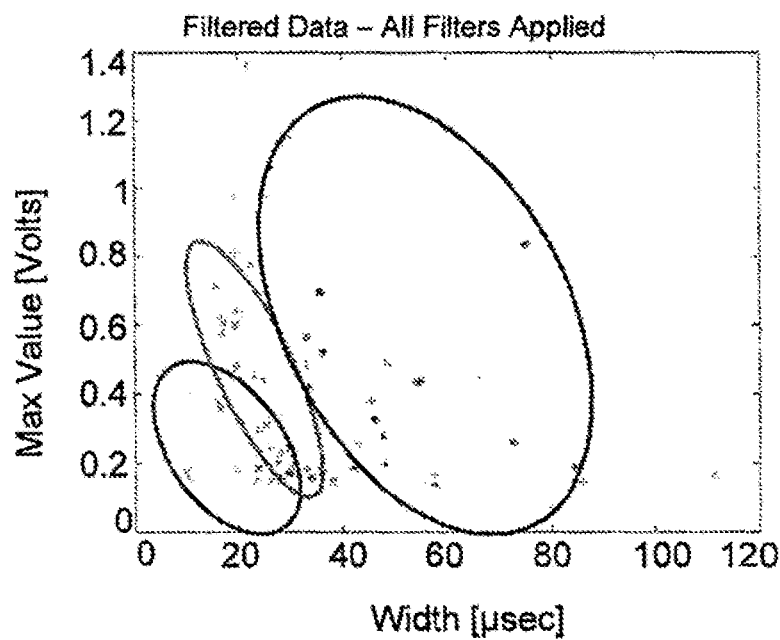
FIG. 7 shows an example of how the invention can be used for classification by clustering.

FIG. 7 shows the data in a two dimensional feature space. A set of interactions were acquired for 3 different types of Algae: *Chlorela*, *Tetrahedron*, and *Pediastrum* (indicated in the figure respectively by x, +, and *). Validation filters on the interaction signals, including symmetry of the two channels; interaction rise time, and others were applied. The Validation filters assure that the interaction is in the focal zone of the dark beam. Tests were conducted with various sub sets of filters but FIG. 7 presents the data when all validation filters were applied. Features are extracted from the interactions that qualified the validation filters and show the clustering of the different types of algae.

Although the feature space is multi-dimensional, FIG. 7 presents a 2D scatter diagram wherein the X axis is the interaction pulse width in microseconds and the Y axis the maximal signal per interaction as detected by the detectors. Already in this 2D presentation there is a clear grouping of the different algae types. To help manifest this grouping ellipses were outlined in the figure to indicate the boundaries between the groups. In this 2D presentation there is still some overlap, which could be reduced in a multi-dimensional feature space. Artificial Intelligence clustering techniques are then used, in the multi dimensional space, to identify the boundaries.

The application of this mechanism is such that once the clusters of known algae are established, it is possible to monitor, for example, water contaminated with algae and detect in a mixture whether algae complying with the clusters appear. This would give real time information on the algae population and feedback to any process attempting to reduce the algae population.

While the capability of the invention is demonstrated herein on algae, it can be used with all its detection options described above, to train the system on other events, such as pathogenic organisms and upon appearance of an event complying with the cluster of the said organism an alarm signal will be triggered. The analogy is drawn to a fingerprint, where objects of the same group will have commonality in the feature space and could be identified via this commonality in the same way a person is identified by his fingerprint.

Figure 8:
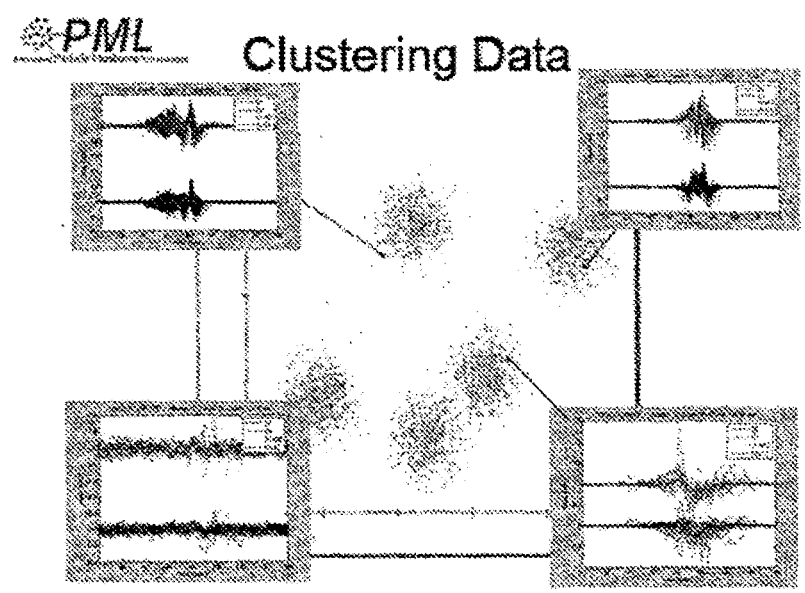
FIG. 8 shows an example of multi-dimensional clustering using an un-supervised learning method.

The classification by clustering approach can be extended to a multi-dimensional space using artificial intelligence tools to teach the system the nature of specific events and then to monitor for the presence of such events. One embodiment of the invention is to cluster the detectors signals by un-supervised learning (Visit http://www.auton-lab.org/tutorials/for Andrew's repository of Data Mining tutorials). FIG. 8 shows an example of multi-dimensional clustering using an un-supervised learning method.

Figure 9:
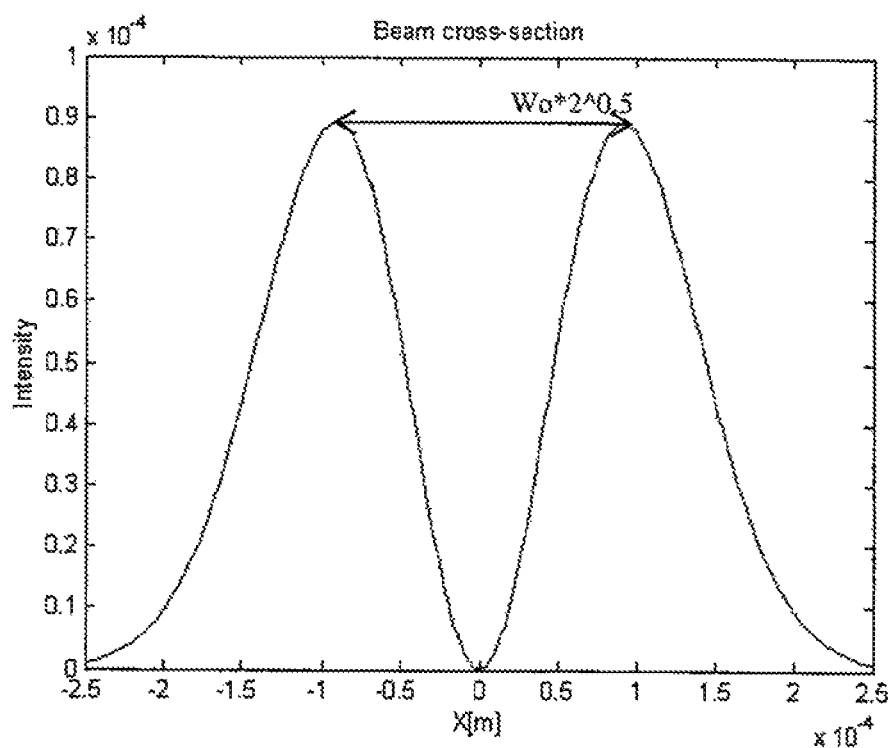
FIG. 9 schematically shows the profile of the dark beam.
Figure 11:
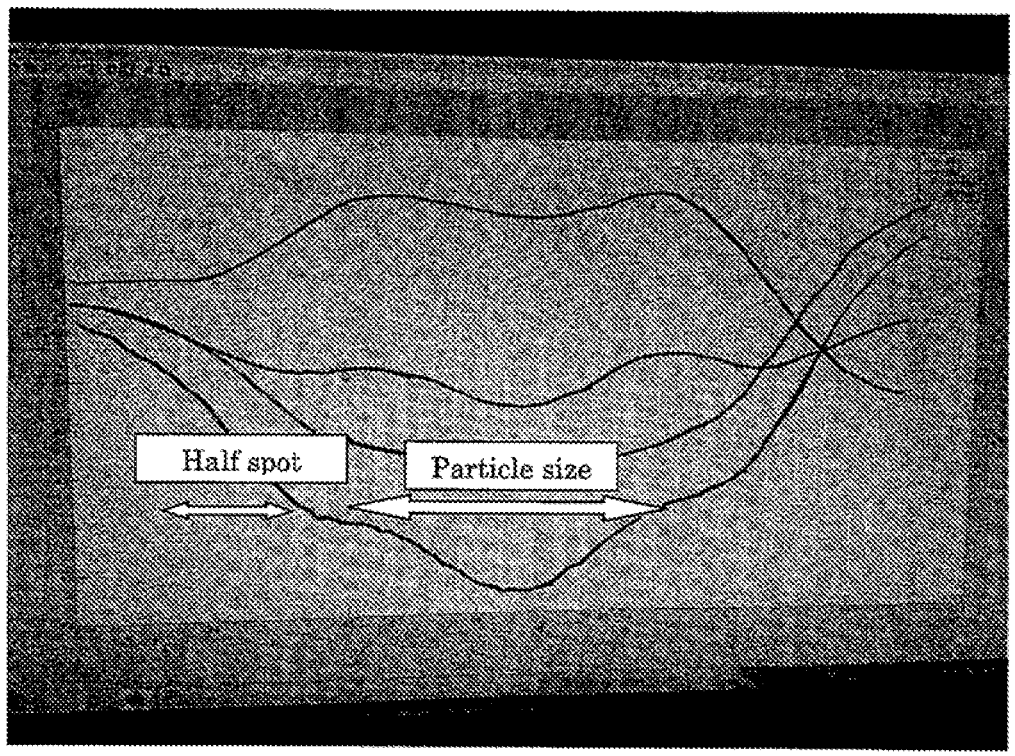
FIG. 11 is a screen shot showing two shoulders in the interaction signal, which correspond to half the spot size.

The measuring systems of FIG. 1 and FIG. 6 can be used to measure the intrinsic velocity of the particles moving through the cuvette. This is possible because the interaction signal duration is scaled inversely to the particles velocity. While in some configurations a constant and known velocity could be achieved a more general approach of the present invention is to extract the velocity information from the intrinsic information in the interaction signal. This is done by accounting for the profile (shown schematically in FIG. 9) of the dark beam. The distance between the intensity peaks of the lobes of the beam profile is equal to WO*2^0.5, where WO is the Gaussian waist. This value is known and hence can be used to measure the crossing particle velocity, while the modulation depth is used to extract the size information. This is applicable for small particles where the "lens effect" of the particle is negligible. For larger particles there will be 2 shoulders in the interaction signal which correspond to half the spot size, as shown in FIG. 11.

Many particle monitoring applications are characterized by a large population of very small particles, doped with slightly larger particles. Examples could be colloids; CMP slurry; crystallization processes and more. The ratio of the tail concentration of the slightly larger particles could be 10^6:1 or so smaller compared to the main concentration. The state of the art instrumentation today is practically blind to these small concentrations. While small and challenging to measure, this small tail could cause damages and scratches in the case of CMP or other processes. The present invention offers the ability to measure concentrations which are 10^6:1 smaller in this tail. The spot size is selected such that the majority of the population is filtered out and becomes a background noise while the larger particles are shown as clear interactions.

Figures 10A, 10B:
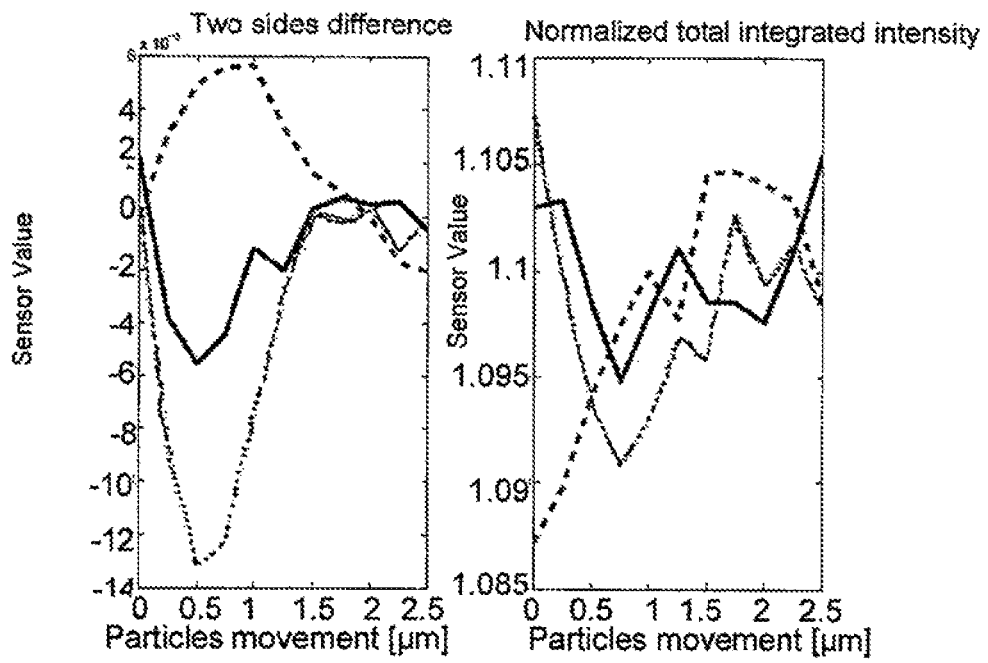
FIG. 10A shows the differential signal of the two detector signals for three illuminating beam structures in the presence of noise and the advantage of the dark beam in suppressing common noise.
FIG. 10B shows the summation signal of the two detector signals for same three illuminating beam structures as in FIG. 10A.

The present invention, based on the dark beam illumination in conjunction with recording the detector signals as a differential signal of the two detectors is extremely robust to the background noise and can facilitate detection in a high level of background noise. This robustness is illustrated by the simulations presented in FIG. 10A and FIG. 10B. FIG. 10A shows the differential signal on an arbitrary scale while a 200 nm particle crosses the beam from the center for three illuminating beam structures: Gaussian (dashed lines), Gauss-Laguerre (solid lines), and Dark beam (dotted lines). FIG. 10B is similar to FIG. 10A but for the summation of the two detector signals. The simulations were conducted under semi-dynamic noise containing 10% of the total illuminating power and the other optical parameters in the simulation were as follows:

NA=0.125

λ=400 nm

In FIG. 10A a signal higher by a factor of two is achieved for the dark beam compared to the signals for the other two beam structures. The difference in sign of the curves is not material and depends on the order of the detectors in the subtraction relative to the particle direction.

Bearing in mind the larger spot and depth of field of the dark beam compared to the Gaussian beam, for achieving a valid measurement of particles smaller than spot, the noise immunity is even more apparent. The significant advantage in the noise reduction of the differential configuration (FIG. 10A) as compared to the summation configuration (FIG. 10B) is obvious.

In actual measurements a measurement set-up based on the present invention was able to detect the tail of larger particles, the concentration of which was 10^6 times smaller in concentration than the main population of the smaller particles.

Although embodiments of the invention have been described by way of illustration, it will be understood that the invention may be carried out with many variations, modifications, and adaptations, without exceeding the scope of the claims.

The invention claimed is:

1. A particle monitoring system comprising:

a cuvette;

a laser that generates a Gaussian laser beam;

a phase mask for converting said Gaussian laser beam into a non-Gaussian dark beam;

a focusing lens that focuses said non-Gaussian dark beam onto particles moving through said cuvette; and a first detector and a second detector each positioned to receive said dark beam transmitted through said cuvette; wherein the dark beam transmitted through said cuvette is characterized by a first intensity lobe and a second intensity lobe; and wherein the first detector is positioned over the first intensity lobe of the dark beam and the second detector is positioned over the second intensity lobe of the dark beam;

wherein the first and second detectors are separated from each other by a spacing and are optimized for sensitivity by alignment of the spacing between the first and second detectors to the maximum intensity gradient of the non-Gaussian dark beam;

wherein said focusing lens directs said non-Gaussian dark beam in said cuvette such that the particles cross a focal region of said non-Gaussian dark beam;

wherein the first detector and the second detector generate signals corresponding to particle size and particle concentration of the particles passing through the cuvette due to the interaction between the non-Gaussian dark beam and the particles.

2. The particle monitoring system of claim 1, wherein the particles move through the non-Gaussian dark beam in a direction at an angle of 90 degrees relative to the direction of said dark beam;

wherein the signals of the first and second detectors qualitatively represent interferometry response;

wherein a first particle, having a refractive index that is larger than the surrounding medium, induces firstly a negative signal in the first detector and then induces a positive signal in the second detector;

wherein a second particle, having a refractive index that is smaller than the surrounding medium, induces firstly a positive signal in the first detector and then induces a positive signal in the second detector.

3. The particle monitoring system of claim 1, wherein the signals from the first and second detectors are recorded in at least one of the following ways:

a) as separate signals;

b) as a differential signal of the first detector and second detector signals; and c) as the sum of the first detector and second detector signals;

wherein the system is further configured to allow measurement of backscattering of radiation from the particles;

wherein the system comprises a beam splitter, a collecting lens, a pinhole, and a backscatter detector;

wherein backscatter radiation from a particle that is in the focus of the focusing lens is collected by the focusing lens, is collimated, is reflected by the beam splitter, and is directed via the collecting lens which focuses the radiation through the pinhole onto the backscatter detector.

4. The particle monitoring system of claim 1, comprising a beam splitter and a second set of two forward detectors oriented in a perpendicular direction to the dark line of the dark beam;

wherein the detectors of the second set of two forward detectors are large relative to the beam size;

wherein the system is to check the symmetry of the signals from said second set of two detectors, in order to determine whether (I) a particle has crossed the focal zone along its diameter and therefore the signals are equal, or (II) the particle has crossed the focal zone along a chord and therefore the signals are different;

wherein the system is to check the symmetry of the signals from said second set of two forward detectors, in order to further determine (i) the width of the interaction, and (ii) the depth of modulation in the signal;

wherein, based on the timing of the signals from said second set of two forward detectors, the system determines also (I) the alignment of the particle flow direction, and (II) to what extent said particle flow direction is laminar and perpendicular to the optical axis.

5. The particle monitoring system of claim 1, comprising a beam splitter and a third detector arranged to allow simultaneous measurement of back scattered radiation from the particles;

wherein the third detector comprises a backscatter detector which is configured (A) to perform a confocal detection scheme and to verify that the interaction with the particle was in focus, and (B) to provide size information, wherein, for particles smaller than the dark spot, the dark beam modulation is inversely proportional to the particle size; and wherein, for particles larger than the dark spot and moving with constant velocity, the interaction duration is proportional to the particle size; and (C) based on back scattering interaction, to differentiate among particle groups based on details of the interaction; and (D) to detect fluorescence generated by the illuminating beam.

6. The system of claim 1, wherein said particle detection system further comprises a processor configured to carry out algorithms to map the signals corresponding to particle size and particle concentration.

7. The system of claim 6, wherein said processor maps the signals corresponding to particle size and particle concentration as a function of time.

8. The system of claim 1, wherein said particle detection system further comprises a processor configured to characterize and differentiate the particles using validation filters.

* * * * *